United States Patent
Cristescu et al.

(10) Patent No.: US 9,342,862 B2
(45) Date of Patent: May 17, 2016

(54) ZOOMING A DISPLAYED IMAGE (75) Inventors: Sorin Alexandru Cristescu, Eindhoven (NL); Tibor Duliskovich, Brookfield, WI (US); Jacobus Sigbertus Marie Geraats, Eindhoven (NL); Harold Johannes Antonius Peeters, Leende (NL); Wijnand Post, 's-Hertogenbosch (NL)

(73) Assignee: Koninklijke Philips N.V., Eindhoven (NL)

( * ) Notice: Subject to any disclaimer, the term of this patent is extended or adjusted under 35 U.S.C. 154(b) by 533 days.

(21) Appl. No.: 13/805,080

(22) PCT Filed: Jun. 28, 2011

(86) PCT No.: PCT/IB2011/052836
§ 371 (c)(1),
(2), (4) Date: Dec. 18, 2012

(87) PCT Pub. No.: WO2012/001625
PCT Pub. Date: Jan. 5, 2012

(65) Prior Publication Data
US 2013/0088519 A1  Apr. 11, 2013

Related U.S. Application Data (60) Provisional application No. 61/359,861, filed on Jun. 30, 2010.

(51) Int. Cl.
*G06T 3/40* (2006.01)
*G06T 1/00* (2006.01)

(52) U.S. Cl.
CPC .... *G06T 3/40* (2013.01); *G06T 1/00* (2013.01)

(58) Field of Classification Search
None
See application file for complete search history.

(56) References Cited

U.S. PATENT DOCUMENTS 5,276,785 A     1/1994  MacKinlay et al.
7,912,829 B1 *  3/2011  Mathes et al. ............... 707/707
(Continued)

FOREIGN PATENT DOCUMENTS

EP  0693852 A2  1/1996
JP  04188031 A  7/1992

OTHER PUBLICATIONS

Anonymous, URL:http://download.cnet.com/xnview/3000-2192_4-10656669.html, Nov. 8, 2008, 1 Page.
(Continued)

*Primary Examiner* — Barry Drennan
*Assistant Examiner* — Diana Hickey (57) ABSTRACT

A system for displaying an image in a viewport includes a zoom subsystem (6) arranged for gradually zooming the image (401) towards a scale factor at which the image just fits within the viewport (302). The zoom (6) subsystem is arranged for keeping a fixed point (403) fixed within the viewport (302). The fixed point (403) depends on a pan/zoom parameter (7) of the image (401) at the time zooming starts. The fixed point (403) is a point of the image (401) which is being displayed in the viewport (302) at the time zooming starts. The image (401) is capable of being zoomed to a zoom level at which the image just fits within the viewport (302), while the fixed point (403) is kept fixed with respect to the viewport (302).

15 Claims, 3 Drawing Sheets

(56) References Cited

U.S. PATENT DOCUMENTS

| | | | | |
|---|---|---|---|---|
| 2004/0233222 A1* | 11/2004 | Lee | ........................ | G06F 3/0481 345/621 |
| 2005/0041044 A1* | 2/2005 | Gannon | ........................ | 345/660 |
| 2005/0068340 A1* | 3/2005 | Lipsky | ................... | G06F 3/0481 345/661 |
| 2011/0109581 A1* | 5/2011 | Ozawa | ................... | G06F 3/0481 345/173 |

OTHER PUBLICATIONS

McClelland", Photoshop 6 for Windows Bible", IDG Books Worldwide, Inc, pp. 39-43, Undated.

* cited by examiner

ZOOMING A DISPLAYED IMAGE

FIELD OF THE INVENTION

The invention relates to displaying an image. The invention further relates to zooming a displayed image. The invention further relates to zooming out a displayed image.

BACKGROUND OF THE INVENTION

Magnifying parts of diagnostic images is important for medical image interpretation, as it allows a better view of anatomical structures relevant for diagnostic purposes. In the case of conventional X-ray film, this was achieved by means of a magnifying glass which was held and moved around in front of the film on a light-box. In the digital age, many image viewing applications offer pan and zoom functionality to enable a user to select a portion of an image for viewing at a selected magnification or zoom level. Medical imaging applications may offer pan and zoom functionality to enable a user to analyze the images and any pathologies visible in the images in a greater detail. The zoom functionality is also used for other kinds of images, such as geographic maps in navigation systems. Typical imaging applications use zoom and pan functionality in order to allow a user to expose places of interest in the image and to show details of those places. Zoom (enlargement) and pan (translation) are considered basic operations to imaging applications, and therefore they are frequently used during an imaging interpretation session.

In existing image viewing applications, the zoom operations are typically oriented to the center of the viewport: during zoom-in and zoom-out operations, the center of the viewport is kept stationary. In other words, the image point which is displayed at the center of the viewport remains at the center, while the remaining image points diverge away from the center or converge towards the center. Alternatively, a point in the image is selected using a mouse pointer, and this point is kept fixed during the zoom operation. The remaining points diverge away from this point or converge towards this point. This means that an indicated pixel remains fixed, while the other image pixels move away from (for zoom-in) or towards (for zoom out) that pixel.

However, during a zoom-out operation, the image may move partially or completely out of view. This way, the display area is not fully used. Moreover, additional panning may be necessary to view a larger portion of the image. Some existing image viewing applications attempt to prevent that the viewport is not fully used; however, these image viewing applications change the direction in which the image pixels are moved during the zoom operation as soon as an image boundary appears in the viewport. This may be disturbing for a user.

SUMMARY OF THE INVENTION

It would be advantageous to have an improved way of displaying an image in a viewport. To better address this concern, a first aspect of the invention provides a system comprising a zoom subsystem capable of gradually zooming the image towards a scale factor at which the image just fits within the viewport, wherein the zoom subsystem is arranged for keeping a fixed point fixed within the viewport, wherein the fixed point depends on a panning parameter and a zoom parameter of the image at the time zooming starts, wherein the fixed point is a point of the image which is being displayed in the viewport at the time zooming starts, and wherein the image is capable of being zoomed to a zoom level at which the image just fits within the viewport, while the fixed point is kept fixed with respect to the viewport.

By fixing this particular point in the viewport, the image is zoomed in such a way that, when the appropriate zoom level has been reached, the image just fits within the viewport. Consequently, additional panning to view the image entirely is not necessary. The image is zoomed gradually, and the zoom operation is perceived as pleasing, because the fixed point is kept constant during the zoom operation. The remaining points of the image converge towards (or diverge away from) the fixed point. The result is that the direction in which image pixels are moved does not change during the zoom operation. The zoom subsystem may be arranged for zooming out the image. However, this is not a limitation. A zoom-in operation may be performed based on the same fixed point, in particular when the image is displayed at a zoom level at which the image is smaller than the size of the viewport, so that the image can be enlarged to see the whole image at a larger scale. The expression 'just fits' refers to the largest magnification at which the image can be appropriately displayed in the viewport (after panning, if needed). The zoom subsystem may be arranged for taking into account a margin around the image. This aspect of the invention is based on the insight that an image point which is already displayed at a viewport point where it would also be displayed when the image is shown such that it just completely fits within the viewport, may be kept there throughout the zoom operation to avoid unnecessary panning.

The system may comprise a fixed point determiner for determining the fixed point, wherein a viewport coordinate of the fixed point normalized with respect to a size of the viewport corresponds to an image coordinate of the fixed point normalized with respect to a size of the image. The fixed point can be found by comparing viewport coordinates and image coordinates of several points, until a point is found for which the normalized coordinates are the same or very close to each other.

A portion of the viewport covered with the image when the image just fits within the viewport may be referred to as a target region. The fixed point determiner may be arranged for determining the fixed point such that a position of the fixed point expressed in coordinates with respect to the target region and normalized with respect to a size of the target region corresponds to image coordinates of the fixed point normalized with respect to a size of the image. This allows the zoom subsystem to take into account differences in aspect ratio of the image and the viewport.

The zoom subsystem may be arranged for zooming the image, with the fixed point kept fixed, until an outer boundary of the image touches an outer boundary of the viewport on at least two opposite sides of the image. This further defines the concept 'just fits'. However, the expression 'touches' should be understood to allow an optional predetermined margin between the outer boundary of the viewport and the outer boundary of the image.

The system may comprise a target region determiner for determining the target region having the outer boundary similar in shape to the outer boundary of the image, and having a maximum size which just fits in the viewport. This makes it easier to perform the zoom operation. For example, after the target region is determined, computations can be performed based on the coordinates of the target region.

The system may comprise a user input unit for receiving an instruction to zoom out, wherein the zoom subsystem is operative to gradually zoom out the image in response to the user input. This allows the user to control the zoom-out operation. Similarly, an instruction to zoom in may be received, in response to which the zoom subsystem is operative to gradually zoom in the image in the way set forth.

The system may comprise a pan subsystem for panning the image in response to a user input, wherein the pan subsystem is configured to refuse panning when the panning would cause a boundary of the image to appear in the viewport. This is another measure to prevent a portion of the viewport becoming unused.

The fixed point determiner may be arranged for determining a fixed point satisfying $$\frac{I.x}{\text{size\_x}(I)} = \frac{V.x}{\text{size\_x}(V)} \text{ and } \frac{I.y}{\text{size\_y}(I)} = \frac{V.y}{\text{size\_y}(V)},$$

wherein (I.x, I.y) represent coordinates of the fixed point with respect to the image; (V.x, V.y) represent coordinates of the fixed point with respect to the viewport or the target region; size_x(I) and size_y(I) represent a size of the image in x direction and y direction, respectively; and size_x(V) and size_y(V) represent a size of the viewport or the target region in x direction and y direction, respectively. This way, the image coordinates, scaled with respect to the size of the image, correspond to the viewport or target region coordinates, scaled with respect to the size of the viewport or target region. The point for which this equation holds, is at the same position when the image precisely covers the viewport or target region. Consequently, it can be fixed during e.g. a zoom-out operation, to ensure that at some zoom level the viewport or target region will coincide with the image area.

The fixed point determiner may be arranged for determining a fixed point satisfying $$\begin{pmatrix} sx & 0 & tx \\ 0 & sy & ty \\ 0 & 0 & 1 \end{pmatrix} \begin{pmatrix} I.x \\ I.y \\ 1 \end{pmatrix} = \begin{pmatrix} V.x \\ V.y \\ 1 \end{pmatrix},$$

wherein (I.x, I.y) represent coordinates of the fixed point with respect to the image; (V.x, V.y) represent coordinates of the fixed point with respect to the viewport or the target region; sx and sy represent a scaling factor of the image in x direction and y direction, respectively; and tx and ty represent a translation of the image in x direction and y direction, respectively. This equation represents a coordinate transformation between viewport or target region coordinates and image coordinates.

The fixed point determiner may be arranged for determining as the fixed point coordinates (V.x, V.y): V.x=tx*size_x(V)/(size_x(V)−sx*size_x(I)) and V.y=ty*size_y(V)/(size_y(V)−sy*size_y(I)), wherein (V.x, V.y) represent coordinates of the fixed point with respect to the viewport or target region; sx and sy represent a scaling factor of the image in x direction and y direction, respectively; and tx and ty represent a translation of the image in x direction and y direction, respectively. This represents a solution of the above two equations.

The zoom subsystem may be arranged for performing a zoom operation by filling a viewport or target area with successively greater or smaller portions of the image, wherein the successively greater or smaller portions are selected such that corner points of the successively greater or smaller portions approach corresponding corner points of the image in steps whose step size is proportional to respective distances between the corner points of the successively greater or smaller portions and the corresponding corner points of the image. This defines another way in which the zoom operation may be implemented. The fixed point is kept fixed when the zoom operation is performed based on these distances.

In another aspect, the invention provides a workstation comprising the system set forth.

In another aspect, the invention provides an image acquisition apparatus comprising the system set forth.

In yet another aspect, the invention provides a method of displaying an image in a viewport, comprising:
gradually zooming the image towards a scale factor at which the image just fits within the viewport; while keeping a fixed point fixed within the viewport, wherein the fixed point depends on a panning parameter and a zoom parameter of the image at the time zooming starts, wherein the fixed point is a point of the image which is being displayed in the viewport at the time zooming starts, and wherein the image is capable of being zoomed to a zoom level at which the image just fits within the viewport, while the fixed point is kept fixed.

In another aspect, the invention provides a computer program product comprising instructions for causing a processor system to perform the method set forth.

It will be appreciated by those skilled in the art that two or more of the above-mentioned embodiments, implementations, and/or aspects of the invention may be combined in any way deemed useful.

Modifications and variations of the image acquisition apparatus, the workstation, the method, and/or the computer program product, which correspond to the described modifications and variations of the system, can be carried out by a person skilled in the art on the basis of the present description.

A person skilled in the art will appreciate that the method may be applied to multi-dimensional image data, e.g. to two-dimensional (2-D), three-dimensional (3-D) or four-dimensional (4-D) images, acquired by various acquisition modalities such as, but not limited to, standard X-ray Imaging, Computed Tomography (CT), Magnetic Resonance Imaging (MRI), Ultrasound (US), Positron Emission Tomography (PET), Single Photon Emission Computed Tomography (SPECT), and Nuclear Medicine (NM).

BRIEF DESCRIPTION OF THE DRAWINGS

These and other aspects of the invention are apparent from and will be elucidated with reference to the embodiments described hereinafter. In the drawings.

DETAILED DESCRIPTION OF EMBODIMENTS

In digital imaging, an image may be displayed at many different scales. Such scales may also be referred to as or magnification factors or zoom levels. The term "zoom" may refer to enlarging a portion of an image on the screen, for example based on pixel interpolation of the image data. Also, when considering three-dimensional images, it may be noted that a two-dimensional representation, for example a projection, may be visualized in a viewport of a display. Such a two-dimensional representation is again an image which may be zoomed in and out. Panning of an image may refer to a translation of the image with respect to the viewport, i.e. after panning, another portion of the image is displayed in the viewport, in principle at the same zoom level.

Figure 1:
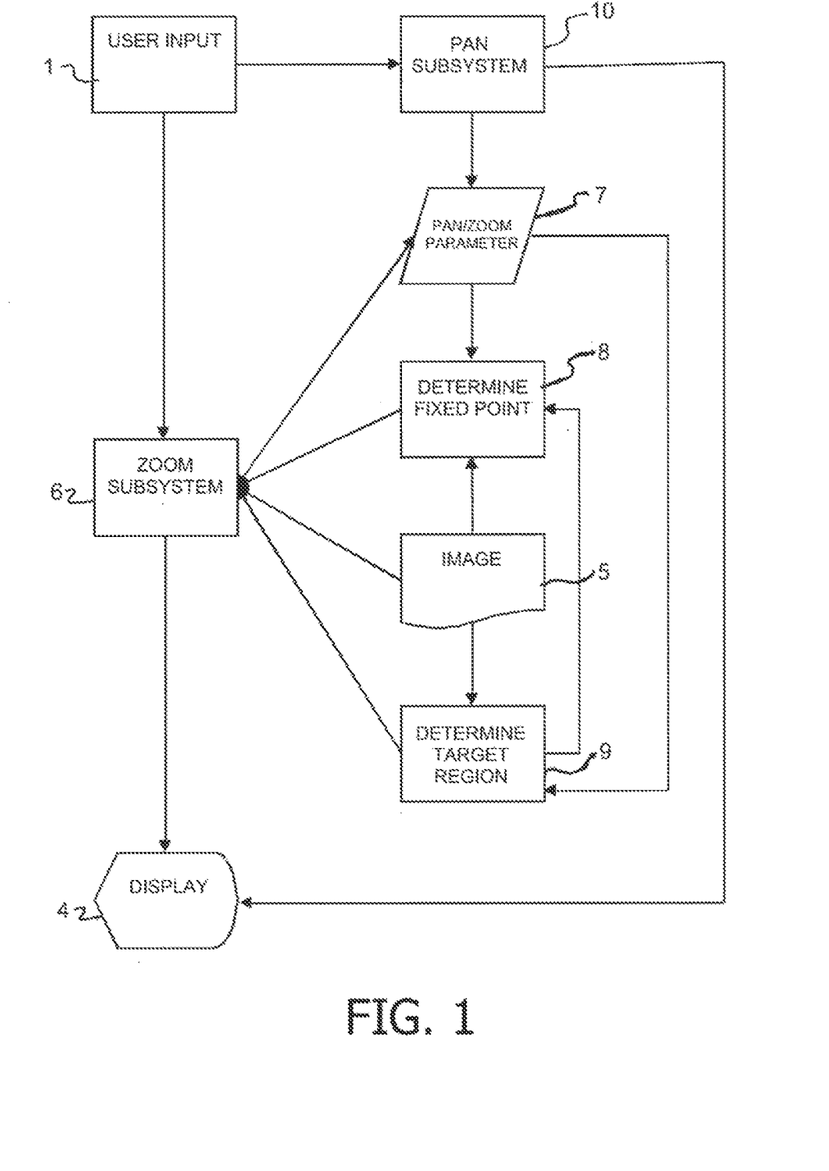
FIG. 1 is a block diagram of a system for displaying an image.

FIG. 1 illustrates a system for displaying an image. The system may comprise a display 4 for displaying an image, a user input device such as a mouse and/or a keyboard for enabling a user to control the system, and a communications port for connecting the system to a source of images, such as a picture archiving and communication system. Moreover, the system may comprise local storage means for storing one or more images and/or a computer program to be executed by a processor. These possible elements of the system are not shown in the drawing.

A user input subsystem 1, operatively coupled to a user input device, may be arranged for enabling the user to control a zoom operation by indicating, after the viewport has been filled with a portion of the image, whether zooming is desired. The zoom operations may be controllable in real-time, allowing the user to control the scale of the image by means of user commands, which user commands may be indicative of an increase or a decrease of the scale factor at which the image is to be displayed. In response to receipt of a command indicative of an increase of the scale factor (e.g. a decrease of the zoom level), the zoom subsystem fills the viewport with a greater portion of the image 5. Alternatively, successively increasing portions of the image may be shown at predefined time intervals, and the user commands may be used to start/stop the zoom process and/or to control the speed of the zoom operation.

Figure 3:
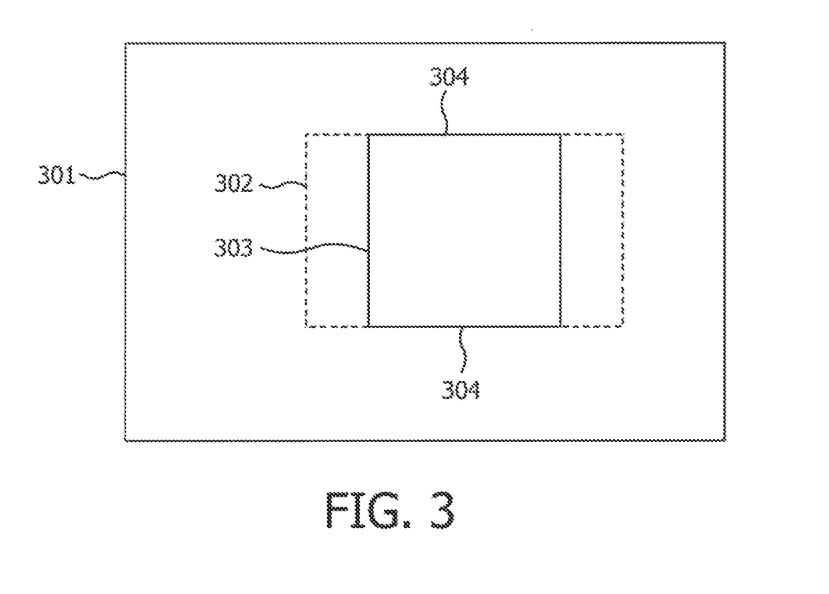
FIG. 3 is a diagram of a display with a viewport.

FIG. 3 illustrates a display area 301 of a display device. The display device can be, for example, a computer monitor, a television, or a mobile device such as a mobile phone or a personal digital assistant. The display area 301 may show information from one or more applications, for example using a window system. However, the use of a window system is not a limitation. The display area 301 may comprise a viewport 302. Generally, a viewport should be understood to correspond to at least a portion of the display area 301. The viewport may be a sub-area of the display area 301, and suitable for display of at least a portion of an image. The viewport may also correspond to the complete display area 301. The concept of viewport should not be limited to any particular kind of widget of a windowing system, as a viewport can be implemented in many ways known to the skilled person.

Figure 4A:
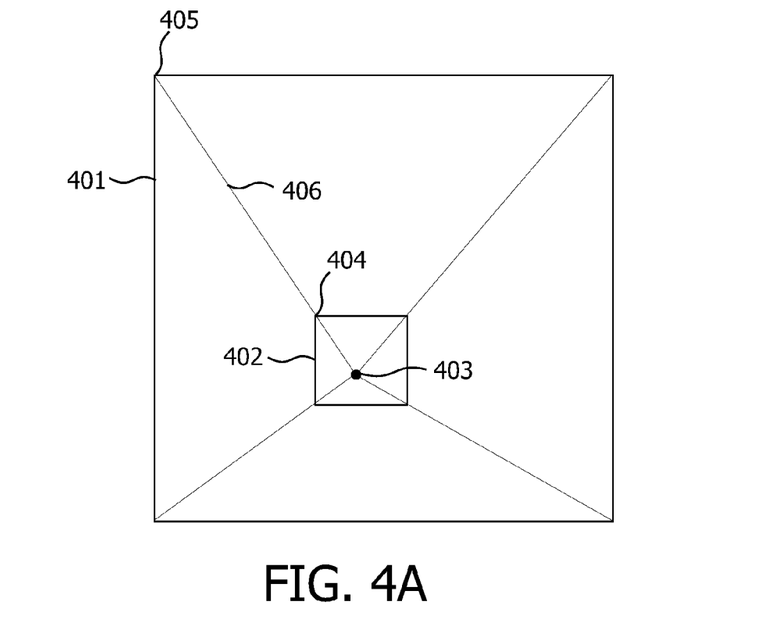
FIG. 4A is a diagram of an image indicating a portion thereof.

FIG. 4A illustrates an image 401. The image 401 represents an at least two-dimensional array of image points which may be displayed as a picture. Typically, the image 401 contains information about pixel values of pixels. These pixels are not shown in the Figure. The Figure does show a portion 402 of the image 401. The portion 402 can be displayed in the viewport 302 of the display area 301. Different portions of the image may be shown by panning and/or zooming the image.

Figure 4B:
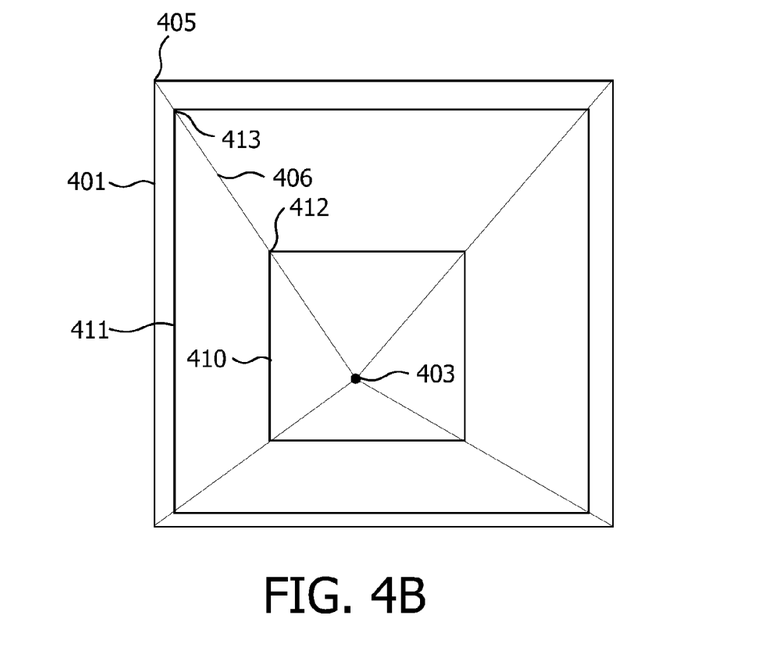
FIG. 4B is a diagram of the image indicating two other portions thereof.

FIG. 4B illustrates the same image 401. Throughout the Figures, similar items are labeled with the same reference numerals. FIG. 4B shows two other portions 410 and 411 of the image 401.

Points of the image 401 may be identified by means of a coordinate system. Coordinate systems may differ in respect of the origin and the scale used to express the coordinates. An image coordinate system may have an origin which is fixed with respect to the image. For example, the origin may be chosen as a corner point 405 of the image. Alternatively, the center of the image may be chosen as the origin. Other choices for the origin are also possible. A viewport coordinate may have an origin which is fixed with respect to the viewport 302. A target region coordinate system may have an origin which is fixed with respect to the target region 303. The origin may be chosen as a corner point or middle point of the viewport or target region, respectively. The image points have the coordinates of the position within the viewport or target region at which they are displayed. Consequently, for the latter two coordinate systems, the coordinates of image points depend on the pan/zoom parameters used to display the image.

In the following, aspects of the system shown in FIG. 1 will be explained with reference to FIGS. 3, 4A, and 4B.

The system may comprise a zoom subsystem 6 for gradually zooming the image 401 towards a scale factor at which the image just fits within the viewport 302. The zooming may be performed stepwise. In the case of zoom-out, increasing portions of the image are displayed in the viewport, each portion containing the previous portion. In the case of zoom-in, the portions decrease in size and each portion is a sub-portion of the next portion. The portions may be scaled to fit the viewport. The zoom subsystem 6 may be arranged for displaying a fixed point 403 at a fixed position within the viewport 302, throughout a zoom operation. The fixed point 403 may depend on a pan/zoom parameter 7 of the image 401 at the time of starting the zoom operation. The fixed point 403 may be a point of the image 401 which is being displayed in the viewport 302 at the time zooming starts. This makes sure that the zoom operation does not unexpectedly shift the image with respect to the viewport. The fixed point satisfies the property that the image 401 can be zoomed to a zoom level at which the image just fits within the viewport 302, while the fixed point 403 is kept fixed with respect to the viewport 302. The effect of this fixed point can be obtained using several different kinds of computations, as will be explained in the following.

It will be understood that the zoom operation with the fixed point as described above may be applied to zoom in and zoom out operations. For zoom-out operations, it has the advantage that the viewport or target region is used as much as possible, i.e., with as little space left unused as possible, while the image point is converged to a single, steady, fixed point until the image is shown completely. For zoom in operations, in particular when the image is shown at a small scale factor at which the viewport or the target region is not completely used, the fixed point described above helps to ensure that during the zoom-in operation, the image is shown completely within the viewport for as long as possible.

It will be understood that in some systems the method of zooming described herein may be applied to zoom out only. In such systems, the zoom-in functionality may be provided differently. For example, the zoom-in may use a fixed point at the center of the viewport or at a user-selected point. The zoom-in may also be arranged to shift a user-selected point or region of interest towards the center of the viewport during zoom-in, to ensure that the region around the selected point or the region of interest is kept within view during the zoom-in operation.

The system may comprise a fixed point determiner 8 for determining the fixed point 403 explicitly. The fixed point 403 may be determined by means of its coordinates. A viewport coordinate of the fixed point 403 is chosen such that it corresponds to an image coordinate of the fixed point 403. The coordinates may be normalized, in particular the viewport coordinates may be normalized with respect to the viewport 302 and the image coordinates may be normalized with respect to a size of the image 401. This would mean that, when the image is displayed in full in the viewport, such that it completely fills the viewport without distortions, the normalized viewport coordinate is equal to the normalized image coordinate. Consequently, an image point which is already displayed at this point in the viewport may be kept fixed there during the zoom operation, as it would end up there at the end of the zoom operation anyway. This assumes that the origins of both coordinate systems are chosen consistently, for example always the top left corner.

When the shape of the viewport differs from the shape of the image, for example because of a different aspect ratio, a portion of the viewport will remain unused when the undistorted image is displayed in full within the viewport. A portion of the viewport 302 covered with the image 401, when the image 401 just fits within the viewport 302, is referred to hereinafter as a target region 303. The fixed point determiner 8 may be arranged for determining the fixed point 403, taking account of the target region. A position of the fixed point 403 expressed in coordinates with respect to the target region 303 and normalized with respect to a size of the target region 303 may be chosen such that the coordinates are equal to image coordinates of the fixed point 403 normalized with respect to a size of the image 401.

The zoom subsystem 6 may be arranged for zooming the image 401, with the fixed point 403 kept fixed with respect to the viewport 302, until an outer boundary of the image 401 touches an outer boundary of the viewport 302 on at least two opposite sides 304 of the image. When the image 401 'just fits' within the viewport 302, it is shown at a maximum scale, depending on the dimensions of the image and the viewport (taking into account an optional margin), but not depending on which portion of the image is shown in the viewport before the zoom operation starts. In most cases this will lead to a situation in which the image boundary touches the boundary of the viewport 302 on opposite sides, leaving a strip of viewport area unused on either side of the image 303.

The system may comprise a target region determiner 9 for determining the target region 303 having an outer boundary similar in shape to the outer boundary of the image 401, and having a maximum size which just fits in the viewport 302. Having the coordinates and/or dimensions of this target region 303 explicitly, makes it easier to perform the appropriate computations for the zoom operation.

The system may comprise a user input unit 1 configured to receive an instruction to zoom out, wherein the zoom subsystem 6 is operative to gradually zoom out the image 401 in response to the instruction. Likewise, an instruction to zoom in may be supported. The user input unit may enable a user to control the zoom operation in real time. For example, the zoom operation may continue as long as a button is kept pressed down. Alternatively, the duration and speed of the zoom operation may depend on the duration and speed of a mouse drag operation performed by the user.

The system may comprise a pan subsystem 10 for panning the image 401 in response to a user input. The pan subsystem 10 may be configured to refuse panning when panning would cause a boundary of the image 401 to appear in the viewport 302. This way the viewport is kept fully covered with image information. Alternatively, the pan subsystem 10 refuses panning when the boundary of the image would appear in the target region 303. This helps to ensure that a suitable fixed point can be found within the target region 303.

The fixed point determiner 8 may be arranged for determining a fixed point satisfying the following equations:

$$\frac{I.x}{size\_x(I)} = \frac{V.x}{size\_x(V)} \text{ and} \quad \text{(equation 1)}$$

$$\frac{I.y}{size\_y(I)} = \frac{V.y}{size\_y(V)}, \quad \text{(equation 2)}$$

wherein

I.x, I.y represent coordinates of the fixed point 403 with respect to the image 401;

V.x, V.y represent coordinates of the fixed point 403 with respect to the viewport 302 or the target region 303;

size_xI and size_yI represent a size of the image 401 in an x direction and a y direction, respectively; and size_xV and size_yV represent a size of the viewport 302 or the target region 303 in an x direction and a y direction, respectively.

Note that these equations represent examples of corresponding points of normalized coordinate systems, as described above.

The fixed point determiner 8 may be arranged for determining a fixed point 403 satisfying the matrix multiplication equation:

$$\begin{pmatrix} sx & 0 & tx \\ 0 & sy & ty \\ 0 & 0 & 1 \end{pmatrix} \begin{pmatrix} I.x \\ I.y \\ 1 \end{pmatrix} = \begin{pmatrix} V.x \\ V.y \\ 1 \end{pmatrix}, \quad \text{(equation 3)}$$

wherein

I.x, I.y represent coordinates of the fixed point 403 with respect to the image 401;

V.x, V.y represent coordinates of the fixed point 403 with respect to the viewport 302 or the target region 303;

sx and sy represent a scaling factor of the image 401 in an x direction and a y direction, respectively; and tx and ty represent a translation of the image 401 in the x direction and the y direction, respectively.

Note that the above matrix multiplication describes a coordinate transformation between viewport 302/target region coordinates and image coordinates. The matrix multiplication defines which image point is displayed at which viewport point. The scaling factors sx and sy may be referred to as the zoom parameters, whereas the translation tx and ty may be referred to as the pan parameters. These pan/zoom parameters are represented in block 7 of FIG. 1.

By solving the system of equations 1, 2, and 3, the fixed point may be computed. An example solution is provided by using as the fixed point coordinates V.x, V.y:

$$V.x = tx * size\_x(V)/(size\_x(V) - sx * size\_x(I)) \text{ and} \quad \text{(equation 4)}$$

$$V.y = ty * size\_y(V)/(size\_y(V) - sy * size\_y(I)), \text{ wherein} \quad \text{(equation 5)}$$

V.x, V.y represent coordinates of the fixed point 403 with respect to the viewport 302 or the target region 303;

sx and sy represent a scaling factor of the image 401 in an x direction and a y direction, respectively; and tx and ty represent a translation of the image 401 in an x direction and a y direction, respectively.

The corresponding image point may be computed using equation 3. The fixed point determiner 8 may be arranged for computing equations 4 and 5 directly.

The zoom subsystem 6 may be realized with different kinds of computations also. For example, the zoom subsystem 6 may be arranged for performing a zoom-out operation by filling a target region 303 of the viewport 302 with successively greater portions 410, 411 of the image 5, wherein the successively greater portions 410, 411 are selected such that corner points 404, 413 of the successively greater portions 410, 411 approach corresponding corner points 405 of the image 401 in steps whose step size is proportional to respective distances between the corner points 412, 413 of the successively greater portions 410, 411 and the corresponding corner points 405 of the image 401. In the case of a zoom-in operation, the successive portions are decreasing in size instead of increasing. By using the portions computed in this way, the fixed point 403 is kept fixed in the viewport during the zoom operation, and the image 401 is displayed such that it just fits in the viewport when the appropriate zoom factor is reached.

It will be understood that, throughout this description, when a target region of a viewport is filled with a specific portion of an image, the remainder of the viewport may be used to display any image portions surrounding the portion of the image displayed in the target region.

The various implementations of the system as described above may be implemented in a workstation comprising a suitably programmed processor. A user input device, such as a mouse, may be used to control a start, stop, and/or speed of the zoom operation, wherein the speed refers to a change in the zoom factor per second. This interaction may be allowed to control the zoom operation when it takes place, i.e. in real-time. This user interaction is not limited to a workstation, it may also be provided in other embodiments. The system may also be incorporated in an image acquisition apparatus, such as an x-ray or echography apparatus or a magnetic resonance or computed tomography scanner, for enabling user friendly viewing of the images acquired therewith.

Figure 2:
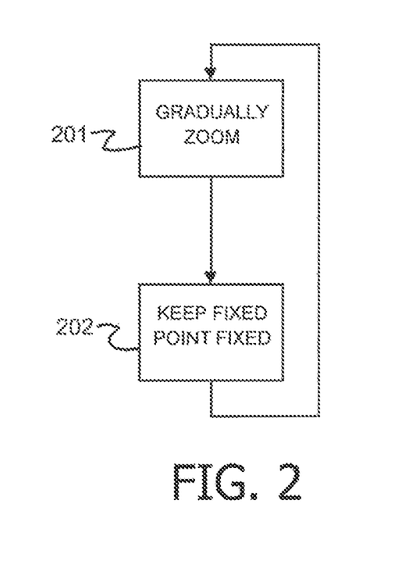
FIG. 2 is a flow chart of a method of displaying an image.

FIG. 2 illustrates a method of displaying an image in a viewport. The method comprises step 201 of gradually zooming the image towards a scale factor at which the image just fits within the viewport. During this zooming, step 202 keeps a fixed point fixed within the viewport, wherein the fixed point depends on a panning parameter and a zoom parameter of the image at the time the zoom-out starts, wherein the fixed point is a point of the image which is being displayed in the viewport at the time the zoom-out starts, and wherein the image is capable of being zoomed out to a zoom level at which the image just fits within the viewport, while the fixed point is kept fixed.

The system can be implemented as a suitably programmed computer workstation. The system can also be incorporated in an image viewing portion of an image acquisition apparatus. Such an image acquisition apparatus can be a computed tomography scanner, an x-ray scanner, an ultrasound scanner, a photographic camera, or any other image scanner. The system can also at least partly be implemented as a web service, wherein the zoom functionality is provided by a web application. The system can also be incorporated in a mobile device such as a mobile phone or personal digital assistant.

Once the image fits the viewport, zooming-out must not be allowed any longer, since that would bring more non-image information inside the viewport. In other words, the viewport area would be used less efficiently because the same image information could be displayed at a larger scale. However, this is not a limitation. When the zoom level at which the image just fits in the viewport has been achieved completely, the zoom subsystem 6 and/or the fixed point determiner 8 may be arranged for relocating the fixed point to the center of the viewport 302 (or target region 303), because that may be the most natural way to perform any further zooming.

Also, panning may be restricted such that the outer boundary of the image is not allowed to cross the viewport. This way, the image cannot be panned 'out of view'. In particular, panning may be restricted such that it does not allow bringing more non-image information inside the viewport than that already present. Herein, non-image information refers to a portion of the viewport which is unused because the image does not contain information for that portion of the viewport in view of the current pan/zoom settings. When the aspect ratios of the image and the viewport are the same, the system can be made such that the viewport is always completely filled with image information by refusing panning or zoom-out when this would introduce non-image information inside the viewport. However, this is not a limitation.

The "fixed point" described in this description refers to a point of the image which is kept fixed at a particular point of the viewport during a zoom-in or zoom-out operation. It will be appreciated that a subsequent zoom-in or zoom-out operation may use a different fixed point, in particular if the image has been panned in between zoom operations.

The following constraints are considered to provide user-friendly zoom and pan functionality for an image viewer. However, these constraints are optional and are not intended to limit the scope of the invention.

a. Do not allow panning of the image beyond the outside boundary of the image, i.e. if it would cause a portion of the viewport to be unused. If a portion of the viewport is already unused, do not allow panning which would increase the unused portion of the viewport.

b. For zoom-out: when the image is displayed completely within the viewport, further zoom-out is disabled. This again avoids that a portion of the viewport becomes needlessly unused. Of course, when the aspect ratio of the image and the viewport are not the same, a portion of the viewport will be unused when the image is displayed completely within the viewport; however this is not regarded as a disadvantage.

c. For zoom-out: avoid changes in the direction in which pixels are moved during zooming (i.e. avoid a zig-zag effect).

d. For zoom-in: Keep a (e.g. user-defined) region of interest inside the viewport when zooming-in. For example, the region centered around a user-indicated position such as the initial mouse pointer location before a zoom-in operation starts may be kept inside the viewport by directing the zoom-in appropriately. For example, the region of interest or indicated position may be moved towards the center of the viewport while zooming in.

An image display subsystem may be arranged for displaying at least a portion of an image in a viewport, the viewport comprising a target region with an outer boundary whose shape corresponds to a shape of an outer boundary of the image. The zoom-out subsystem may be arranged for zooming out the image, thereby displaying a larger portion of the image in the viewport, while keeping an image point fixed at a fixed point of the target region, wherein, when the image is sufficiently zoomed out, the outer boundary of the image substantially coincides with the outer boundary of the target region, with the image point still remaining fixed at the fixed point.

It will be appreciated that the invention also applies to computer programs, particularly computer programs on or in a carrier, adapted to put the invention into practice. The program may be in the form of a source code, an object code, a code intermediate source and object code such as in a partially compiled form, or in any other form suitable for use in the implementation of the method according to the invention. It will also be appreciated that such a program may have many different architectural designs. For example, a program code implementing the functionality of the method or system according to the invention may be sub-divided into one or more sub-routines. Many different ways of distributing the functionality among these sub-routines will be apparent to the skilled person. The sub-routines may be stored together in one executable file to form a self-contained program. Such an executable file may comprise computer-executable instructions, for example, processor instructions and/or interpreter instructions (e.g. Java interpreter instructions). Alternatively, one or more or all of the sub-routines may be stored in at least one external library file and linked with a main program either statically or dynamically, e.g. at run-time. The main program contains at least one call to at least one of the sub-routines. The sub-routines may also comprise function calls to each other. An embodiment relating to a computer program product comprises computer-executable instructions corresponding to each processing step of at least one of the methods set forth herein. These instructions may be sub-divided into sub-routines and/or stored in one or more files that may be linked statically or dynamically. Another embodiment relating to a computer program product comprises computer-executable instructions corresponding to each means of at least one of the systems and/or products set forth herein. These instructions may be sub-divided into sub-routines and/or stored in one or more files that may be linked statically or dynamically.

The carrier of a computer program may be any entity or device capable of carrying the program. For example, the carrier may include a storage medium, such as a ROM, for example, a CD ROM or a semiconductor ROM, or a magnetic recording medium, for example, a floppy disc or a hard disk. Furthermore, the carrier may be a transmissible carrier such as an electric or optical signal, which may be conveyed via electric or optical cable or by radio or other means. When the program is embodied in such a signal, the carrier may be constituted by such a cable or other device or means. Alternatively, the carrier may be an integrated circuit in which the program is embedded, the integrated circuit being adapted to perform, or to be used in the performance of, the relevant method.

It should be noted that the above-mentioned embodiments illustrate rather than limit the invention, and that those skilled in the art will be able to design many alternative embodiments without departing from the scope of the appended claims. In the claims, any reference signs placed between parentheses shall not be construed as limiting the claim. Use of the verb "comprise" and its conjugations does not exclude the presence of elements or steps other than those stated in a claim. The article "a" or "an" preceding an element does not exclude the presence of a plurality of such elements. The invention may be implemented by means of hardware comprising several distinct elements, and by means of a suitably programmed computer. In the device claim enumerating several means, several of these means may be embodied by one and the same item of hardware. The mere fact that certain measures are recited in mutually different dependent claims does not indicate that a combination of these measures cannot be used to advantage.

The invention claimed is:

1. A system for displaying an image in a viewport, comprising:
   a display device;
   a computer processor configured to control the display device to:
      gradually zoom a displayed image towards a zoom level at which an outer boundary of the image touches it boundary of the viewport,
      establish a fixed point based on a panning parameter and a zoom parameter of the image at a time zooming starts, wherein a viewport coordinate of the fixed point normalized with respect to a size of the viewport corresponds to an image coordinate of the fixed point normalized with respect to a size of the image,
      keep the fixed point fixed within the viewport during the gradual zooming,
      determine fixed point coordinates (V.x, V.y):

$V.x = tx * \text{size\_}x(V)/(\text{size\_}x(V) - sx * \text{size}_{13}\_x(I))$ and $V.y = ty * \text{size\_}y(V)/(\text{size\_}y(V) - sy * \text{size}_{13}\_y(I))$, wherein
      (V.x, V.y) represent coordinates of the fixed point with respect to the viewport or the target region;
      sx and sy represent a scaling factor of the image in an x direction and a y direction, respectively; and
      tx and ty represent a translation of the image in an x direction and a y direction, respectively.

2. The system according to claim 1, wherein a position of the fixed point is pressed in coordinates with respect to a target region in which the. two opposite sides of an outer boundary of the image touches the boundary of the viewport and wherein the computer processor is further configured to normalize the viewport coordinate with respect to a size of the target region corresponding to image coordinates of the fixed point normalized with respect to a size of the image.

3. The system according to claim 1, wherein the computer processor is further configured to:
   determine a target region having an outer boundary similar in shape to the outer boundary of the image, and having a maximum size which just fits in the viewport.

4. The system according to claim 1, further including:
   a user input unit configured no receive an instruction to zoom out, the computer processor being configured to gradually zoom out the image in response to the instruction.

5. The system according to claim 1, wherein the computer processor is further configured to;
   pan the image in response to a user input, and refuse to pan when panning would cause the boundary of the image to appear in the viewport.

6. The system according to claim 1, wherein the computer processor is further configured to perform a zoom operation by Oiling is target region of the viewport with successively greater or smaller portions of the image, wherein the successively greater or smaller portions are selected such that corner points of the successively greater or smaller portions approach corresponding corner points of the image in steps whose step size is proportional to respective distances between the corner points of the successively greater or smaller portions and the corresponding corner points of the image.

7. A workstation comprising the system according to claim 1.

8. An image acquisition apparatus comprising the system according to claim 1.

9. A system for displaying an image in a: viewport, comprising:
   a computer processor configured for
   displaying the image in the viewport in accordance with a zoom parameter and a panning parameter, wherein the zoom parameter represents a scaling of the image with respect to the viewport and the panning parameter represents a translation of the image with respect to the viewport, wherein the zoom parameter establishes an initial zoom level different from a zoom level at which an outer boundary of the image touches a boundary of the viewport on at least two opposite sides of the image, wherein the panning parameter establishes a translation of the image configured to display another portion of the image in the viewport at the same zoom level of a portion of the image displayed in the viewport before the translation of the image at the initial zoom level;

establishing a fixed point based on the panning parameter and the zoom parameter of the image for obtaining a point of the image which is being displayed in the viewport at the time zooming starts and which enables the image to be zoomed to the zoom level at which an outer boundary of the image touches the boundary of the viewport on at least two opposite sides of the image while keeping the fixed point fixed with respect to the viewport;

gradually zooming the image from the initial zoom level towards the zoom level at which the outer boundary of the image touches the boundary of the viewport on at least two opposite sides of the image while keeping the fixed point fixed within the viewport during the gradual zooming of the image;

wherein a viewport coordinate of the fixed point normalized with respect to a size of the viewport corresponds to an image coordinate of the fixed point normalized with respect to a size of the image; and wherein the computer processor is configured for determining fixed point coordinates (V.x, V.y):

$$V.x = tx*\text{size\_}x(V)/(\text{size\_}x(V) - sx*\text{size}_{13}x(I)) \text{ and}$$

$$V.y = ty*\text{size\_}y(V)/(\text{size\_}y(V) - sy*\text{size}_{13}y(I)),$$

wherein
(V.x, V.y) represent coordinates of the fixed point with respect to the viewport or the target region;
s.x and sy represent a scaling factor of the image in an x direction and a y direction, respectively;
tx and ty represent a translation of the image in an x direction and a y direction, respectively;
size x(I) and size y(I) represent a size of the image in an x direction and a yd direction respectively; and
size x(V) and size v(V) represent a size of the viewport or the target region in an x direction and a y direction, respectively.

10. The system according to claim 9, wherein a viewport coordinate of the fixed point normalized with respect to a size of the viewport corresponds to an image coordinate of the fixed point normalized with respect to a size of the image.

11. The system according to claim 9,
wherein the computer processor is further configured for determining a fixed point satisfying;

$$\frac{I.x}{\text{size\_}x(I)} = \frac{V.x}{\text{size\_}x(V)} \text{ and } \frac{I.y}{\text{size\_}y(I)} = \frac{V.y}{\text{size\_}y(V)},$$

wherein
(Lx, Ly) represent coordinates of the fixed point with respect to the image.

12. The system according to claim 9,
wherein the computer processor is further configured for determining a flied point satisfying;

$$\begin{pmatrix} sx & 0 & tx \\ 0 & sy & ty \\ 0 & 0 & 1 \end{pmatrix} \begin{pmatrix} I.x \\ I.y \\ 1 \end{pmatrix} = \begin{pmatrix} V.x \\ V.y \\ 1 \end{pmatrix},$$

wherein
(Lx, Ly) represent coordinates of the fixed point with respect to the image.

13. A method of displaying an image in a viewport on a display device comprising:
with a computer processor, establishing a fixed point based on a panning, parameter and is zoom parameter of the image which is being displayed in the viewport at the time zooming starts which enables the image to be zoomed to a zoom level at which margins of the image touch borders of the viewport on at least two opposite sides of the image, wherein the zoom parameter establishes an initial zoom level different from the zoom level at which the at least two opposite side margins of the image touch the borders of the viewport, wherein the panning parameter represents a translation of the image configured to display another portion of the image in the viewport at the initial zoom level;
with the computer processor, displaying the image in the viewport in accordance. with the zoom parameter and the panning parameter and gradually zooming the image front the initial zoom level towards the zoom level at which the outer margin of the image touches the boundary of the viewport on at least two opposite sides of the image while keeping the fixed point fixed within the viewport during the gradual zooming of the image:,
with the computer processor, determining coordinates (V.x, V.y) of the fixed point:

$$V.x = tx*\text{size\_}x(V)/(\text{size\_}x(V) - sx*\text{size}_{13}x(I)) \text{ and}$$

$$V.y = ty*\text{size\_}y(V)/(\text{size\_}y(V) - sy*\text{size}_{13}y(I)),$$

wherein
(V.x, V.y) represent coordinates of the fixed point with respect to the viewport or the target region:
sx and sy represent a scaling factor of the image in an x direction and a y direction, respectively;
tx and ty represent a translation of the image in an x direction and a y direction, respectively; and
size x(I) and size y(I) represent a size of the image in an x direction and a y direction, respectively; and
size x(V) and size y(V) represent a size of the viewport or the target region in an x direction and a y direction, respectively.

14. The method according to claim 13, wherein as the zoom level increases, the translation increases.

15. A non-transitory computer readable medium carrying computer readable instructions which control a computer processor to perform the method according to Claim 13.

* * * * *